Patented Sept. 10, 1940

2,214,354

UNITED STATES PATENT OFFICE 2,214,354

DAMPNESS DETECTING AND INDICATING DEVICE

Marjorie G. Snelling, Allentown, Pa.

No Drawing. Application December 29, 1937, Serial No. 182,373

5 Claims. (Cl. 116—114)

My invention relates to means for detecting and permanently indicating conditions of high humidity such as are generally referred to as "dampness." More particularly my invention relates to methods, products and devices adapted to the production of visible, irreversible and permanent markings from the effects of exposure to conditions of extreme moisture or dampness. The principal object of my invention is to provide indicating paper that can be packed with goods that are liable to sustain damage when subjected to dampness, and that will afford a permanent indication if such goods or materials are subjected at any time to conditions of unfavorably high humidity.

I have discovered that by making an intimate mixture of a highly deliquescent substance, such as zinc chloride, calcium nitrate, ammonium nitrate or like material with a water-soluble dye of high coloring strength, such as Soluble Blue, Nigrosine, Methyl Violet, Crocein Scarlet, Rhodamine or the like, and then disposing this admixture in pasty or in relatively dry condition upon a suitable porous surface, such as a sheet of unsized or lightly sized paper such as tissue paper or ordinary newsprint paper, I obtain a product which has valuable properties as an indicator, or test paper, for the permanent indicating of even temporary exposure to such conditions of high moisture as is generally referred to as "dampness."

In the operation of my invention, the deliquescent substance serves to absorb moisture from the atmosphere, whenever conditions of humidity exist higher than the equilibrium conditions of the particular deliquescent material that is employed. When such condition of high humidity exists, the deliquescent material absorbs moisture and becomes liquid. Being in intimate admixture with the water-soluble dye, the water of deliquescence or water of liquefaction at once begins to dissolve the water-soluble dye, with the production of a very concentrated dye solution. If the admixture of deliquescent solid and water-soluble dye is initially disposed upon a porous surface, the solution is carried by capillarity into space adjacent to that initially occupied by the admixture of water-soluble dye and deliquescent agent, and in such migration dyes or colors the porous supporting solid, with the production of an irreversible and permanent marking upon the surface of the porous material.

In the practice of my invention I prefer to employ as my indicating composition an intimate mechanical admixture of a water-soluble dye, a deliquescent solid, and a binding and bodying agent adapted to give the mixture suitable physical characteristics to permit it to be readily spread or distributed over the porous surface or support and to hold the pulverulent particles together in a solid mass. The binding and bodying agent that I prefer to use is a concentrated aqueous solution of acacia, a solution of acacia containing 250 grams of acacia per liter of solution being satisfactory. Instead of a solution of acacia, however, I may use any other suitable binding and bodying agent, such as an aqueous solution of animal glue, or an equivalent solution of vegetable adhesive made by the treatment of cassava starch with alkali, for example. A heavy starch paste, or any equivalent bodying agent that will leave a solid binding matrix may be employed, although I prefer to employ concentrated aqueous solutions of glue or acacia, and preferably containing a small admixture of phenol, methylparahydroxybenzoate, parachlormetacresol, betanaphthol, or other efficient antimold agent, as my binding and bodying means.

As water-soluble dyes, I may employ any dye that has strong coloring power and that is readily soluble in water. Although I prefer to employ Soluble Blue (Color Index 707), Methylene Blue (Color Index 922), Crocein Scarlet (Color Index 277), Water-Soluble Nigrosine (Color Index 865), Methyl Violet (Color Index 680) and Acid Green (Color Index 666), I have found that any water-soluble dye having very strong dyeing or coloring power may be used with relatively good success in conjunction with the present invention.

As deliquescent agents I preferably select a material whose hygroscopic properties are such as to adapt it to the particular humidity range within which it is desired to have my dampness-detecting means function in its practical application. For example, calcium chloride does not deliquesce when exposed to an atmosphere having a relative humidity of less than 40%, but deliquesces readily when exposed to air having a relative humidity of above 45%. Calcium nitrate does not deliquesce when exposed to an atmosphere having a relative humidity of less than 60%, but deliquesces readily when exposed to an atmosphere having a relative humidity of above 65%. Ammonium nitrate has a deliquescent range very similar to that of pure calcium nitrate. Sodium nitrate does not deliquesce when exposed to an atmosphere having a relative humity of less than 70%, but deliquesces when exposed to an atmosphere having a relative humidity of above 75%. Ammonium sulfate does not deliquesce when exposed to an atmosphere having a relative humidity of less than 80%, but does deliquesce in an atmosphere having a relative humidity of above 85%. Potassium chloride does not deliquesce in an atmosphere having a relative humidity of less than 85%, but does deliquesce in an atmosphere having a relative humidity of above 90%. Potassium nitrate does not deliquesce in an atmosphere having a relative humidity of less than 90%, but does deliquesce in an atmosphere having a relative humidity of 95% or higher.

It will be noted that by the selection of a suitable deliquescent agent, I can make dampness-detecting papers or surfaces, sensitive to any desired degree of dampness. Such papers can be exposed indefinitely to air of lower humidity than the degree of humidity to which the particular deliquescent agent is sensitive, without being in any way affected by such exposure. If, however, such test papers or surfaces are exposed to air or any gaseous atmosphere of higher humidity than that to which the deliquescent agent that is employed is sensitive, the deliquescent agent will begin to absorb moisture, and will continue to absorb moisture until the deliquescent agent has completely dissolved in the moisture that it has thus taken up. The liquid formed by the dissolving of the deliquescent agent in the water which it absorbs from the humid air, then acts as a solvent for the dye, producing a dye solution of high tinctorial strength. If the admixture of deliquescent agent and solid dye was initially disposed upon a porous surface, the dye solution produced by the liquefaction of the deliquescent agent will at once be carried by capillarity to portions of the supporting surface adjacent to the point at which the indicating means was applied, and will there produce a permanent and irreversible marking, that definitely establishes the fact that at some time the admixture was exposed to moisture conditions higher than the humidity range at which the deliquescent agent begins to liquefy in the water which it absorbs because of its hygroscopic nature.

In the preparation of test papers highly sensitive to conditions of dampness, and producing an indication even when exposed to air of relatively low humidity, I prefer to employ such highly hygroscopic and deliquescent materials as phosphorous pentaoxide, zinc chloride, calcium chloride, calcium nitrate, etc. In the preparation of test papers sensitive to an intermediate range of humidity, I prefer to employ such deliquescent agents as ammonium nitrate, ammonium chloride, urea, urea nitrate, dextrose, sodium nitrate, copper nitrate, potassium carbonate, and the like. In the preparation of test papers only sensitive to air of relatively high humidity, I prefer to employ such deliquescent agents as sodium carbonate, potassium bicarbonate and potassium nitrate.

Instead of employing a single deliquescent agent, I may employ a plurality of deliquescent agents in intimate association, and I have discovered that a plurality of deliquescent agents is in all cases more actively deliquescent than a single deliquescent agent when used alone, this behavior being undoubtedly associated with the lowering of vapor pressure which results from the admixture of two hygroscopic materials. For example, ammonium nitrate alone becomes deliquescent when exposed to air having a relative humidity of 60% or higher, while sodium nitrate only becomes deliquescent in relative humidities in excess of 72% to 75%. When an intimate admixture of finely pulverulent ammonium nitrate and sodium nitrate is used, the admixture is deliquescent at all relative humidities in excess of 50%, which is lower than the humidity of even the lower of the two components. A ternary mixture of ammonium nitrate, calcium nitrate and sodium nitrate likewise liquefies at a lower relative humidity than the lowest of its three components, in much the same way that certain ternary alloys melt at a lower temperature than the melting point of any of the three component metals. By utilizing this principle of admixing alkali and alkali earth chlorides and alkali earth nitrates I am able to prepare binary and ternary mixtures that are strongly deliquescent at relative humidities of from 40% to 60%, and I can also employ this same principle in the preparation of binary and ternary mixtures of alkali, alkali earth and even heavy metal sulfates, carbonates, chlorates and perchlorates, as well as with a number of organic deliquescent agents, to obtain deliquescent bodies that absorb moisture to the point of liquefaction within any commercially desired range of humidity. A mechanical mixture of ammonium nitrate and urea liquefies at relative humidities as low as 20%, and a mechanical mixture of ammonium nitrate and calcium nitrate liquefies at relative humidities as low as 30%, and these or similar mixtures can be used with water-soluble dyes in connection with my invention in cases where detecting and indicating means are desired in the range of very low relative humidities.

The exact proportions of water-soluble dye, deliquescent agent and liquid bodying agent that I employ depends of course to some extent upon the characteristics of the particular dye, and the particular deliquescent agent and the particular binding and bodying agent that is used, but in general, with practically all dyes and deliquescent agents I find that it is satisfactory to employ equal weights of dye and of deliquescent agent, and to the mixture of these two materials, thoroughly incorporated, to then add sufficient bodying agent to produce a thick paste, of the consistency desired for spreading, printing or otherwise distributing upon the supporting surface. The consistency that I prefer is that of a paste that may vary in fluidity or consistency from that of a thin syrup, or thin molasses through the consistency of thick molasses, and up to the consistency of an ordinary grade of printing ink. It will of course be evident that the desired consistency is primarily determined by the particular means that is to be employed in distributing the indicating mixture or marking composition over the surface of the porous supporting medium.

I have found that if the mixture of dye, deliquescent agent, and bodying agent is too fluid, it will begin to spread over and through the porous supporting means at once upon being applied in the printing operation. Any tendency of the mixture to spread or to "strike through" the paper, indicates that too high a percentage of acacia, glue solution, or other bodying agent has been used. This condition is corrected by adding to the mixture an additional quantity of the dry admixture of dye and deliquescent agent, or employing an acacia solution of higher acacia content. It will of course be evident that although I prefer to employ equal weights of dye and deliquescent agent, this proportion is based upon the usual characteristics of the common dyes and the common deliquescent agents that I employ. Using a highly hygroscopic deliquescent agent, such as phosphorous pentaoxide or zinc chloride, I may employ relatively less than 50% of the combined weight of dye and deliquescent agent, and with dyes of relatively high color strength, when used in conjunction with a deliquescent agent sensitive only to conditions of high humidity, I may employ a relatively high percentage of deliquescent agent, for the purpose of taking maximum advantage of the deliquescent characteristics of the hygroscopic agent. In my experiments I have varied the composition of my mixtures through a very wide range, while still obtaining entirely satisfactory dampness-detecting and indicating mixtures. For example, using dyes of low color strength, with deliquescent agents of high hygroscopicity, I have employed mixtures containing as much as 80% of dye, and only 20% of the deliquescent agent, while at the other extreme, I have employed as little as 20% of a dye having very high coloring strength, with 80% of a deliquescent agent active mainly in the high humidity range, while still obtaining an excellent and dependable indication on exposure to moisture conditions within the active range of the materials. With dyes of still more powerful tinting strength, or with deliquescent agents of still higher hygroscopicity, I could extend the lower range of these two constituents materially below the 20% minimum within which I have so far obtained satisfactory results, while still obtaining usable indicating devices, and accordingly I do not desire to unduly limit myself as to the relative proportions of dye and deliquescent agent that I may employ in the practice of my invention. Also, in preparing the admixture of dye and deliquescent agent with the binding vehicle or bodying agent, the exact proportions naturally depend upon the efficiency or bodying characteristics of the liquid vehicle. Using a relatively thick acacia solution, containing 250 grams of acacia dissolved in each liter of the solution, I find that satisfactory mixtures are obtained when using approximately equal weights of the bodying agent and the admixture of dye and deliquescent agent. In practice, however, because of the wide variation in the bulk of various dyes, I prefer to make up the complete mixture not by weight but to the desired consistency, adding with constant stirring and milling the powdered mixture of solid dye and solid deliquescent agent to the acacia solution or other bodying agent used until a paste or thick fluid mass is obtained having the consistency desired for the subsequent printing, spreading or distributing steps. When so made up, mixtures of suitable consistency usually contain from 5% to 25% of acacia or other binding agent, on the dry basis, the mixtures being normally made up with acacia solutions containing 25% by weight of acacia. Although I may employ as much as 30% or 35% of binding agent in cases where a high degree of binding action is desirable, there is no lower limit to the amount of the binding agent that is employed, as many deliquescent agents in admixture with water-soluble dyes produce mixtures which possess a considerable degree of binding action, even in the absence of any added binding agent. Although the use of a binding and bodying agent, such as acacia, glue, sodium silicate or a starch adhesive is desirable, and in general forms an advantageous component of my moisture detecting and indicating compositions, yet because of the self-binding nature of many admixtures of deliquescent agents and water-soluble dyes I do not regard a binding agent as an essential component of my detecting mixture. In certain forms of my invention non-aqueous adhesives, such as rubber cement and cellulose nitrate or resinous cements are employed as adhesive agents in securing together duplex sheets of paper or other material between which sheets the dampness-detecting admixture is disposed, and in this case also I find that the use of a water-soluble binding and bodying agent is unnecessary, although such admixture may be employed without any impairment of the efficiency of my dampness indicating and detecting devices.

Having now described the dampness-detecting and indicating compositions or mixtures that I prefer to use, I will refer to some of the many ways in which compositions of this type may be utilized in the preparation of dampness detecting and indicating devices.

In the simplest form of the application of my invention, I simply print markings upon the back of a thin sheet of a very porous white paper, the paper being preferably exposed to warm dry air as it comes from the printing operation, for the purpose of rapidly drying the applied coating of dampness indicating material. The sheet so prepared shows no markings on its opposite side or face, until it is exposed to conditions of humidity within the range to which the paper is sensitive. When exposed to conditions of humidity higher than the deliquescent point of the deliquescent agent employed, the deliquescent agent on the back of the sheet absorbs moisture and liquefies, and then the liquid so formed dissolves the dye, and then "strikes through" the paper because of the porous nature of the paper and the capillary effect of the fibers of which the paper is made, and thus produces upon the face of the sheet a permanent and irreversible indication that the sheet has been exposed to conditions of humidity higher than the minimum range for which the paper is sensitive. In this application of my invention, I may prepare slips of test paper to be packed with cereal products, or any other kind of food product that is likely to be damaged by exposure to conditions of excessive humidity. The packing slip can conveniently bear on its face any suitable wording, pointing out the nature of the markings that will appear, if the material is exposed to excessive humidity, and a suitable frame or window can if desired be provided upon the face of the test paper, within which the markings will appear upon the paper being subjected to conditions of high humidity. If desired, the test paper so prepared can be adhesively secured to a backing sheet of any suitable material, so that the markings on the back of the sheet will be normally invisible, in this case the absorption of moisture by the test paper occurring or taking place primarily or wholly through the paper itself. For example, I have prepared a backing sheet of well-sized and relatively water-proof paper and to this backing sheet I have secured, by means of a non-aqueous adhesive agent such as rubber cement, pyroxylin lacquer or the like, a thin sheet of indicator paper containing on its back printed words or markings made with my dampness indicating compositions, and containing on its face any desired wording printed with ordinary printing ink. Both because of the impervious nature of the backing, and as a result of the highly impervious nature of the non-aqueous adhesive agent used to cement the two sheets together, it is practically impossible for any moisture to enter through the back of the dampness-indicating device prepared in this way. When paper prepared as above, however, is exposed to a damp atmosphere, the porous sheet of paper carrying on its back the admixture of dye and deliquescent agent permits the transfer or passage of sufficient moisture to allow the solution of the deliquescent agent in the water which it absorbs, and the "striking through" of the dye solution is produced, with the production of a highly sensitive and entirely reliable dampness-indicating marking on the front surface of the sheet.

In one very simple form of my invention I coat one side of a sheet of thin, unsized porous paper, of the general nature of newsprint paper, with a thin uniform layer of an admixture of dye and deliquescent agent, and I then secure the treated side of this porous paper to a heavier sheet of non-porous paper by means of rubber cement or other suitable non-aqueous adhesive. I then cut this duplex paper up into narrow strips, which may be of the same size and shape as the test strips of litmus paper, turmeric paper or other test papers used by chemists. The strips of test paper made as described form a dependable "test" of high humidity, when exposed to air or any moisture-laden gas, in just the same way that litmus paper or the like gives an indication of acidity or alkalinity, when exposed to fluids of suitable hydrogen-ion concentration to bring about the change in color of the indicator material, although of course the change occurs at a very much slower rate. It will of course be evident that according to the choice of dye that is used, my indicator papers can be made to respond with any desired color, upon exposure to an atmosphere of high moisture content, and the porous paper used in the preparation of my test sheets may be initially of any pale color, although preferably I prefer white as the initial color of my facing paper, as in this manner I obtain maximum contrast.

My invention has a very wide field of usefulness, both in the laboratory and in commerce. Its greatest field of usefulness is in affording means of preparing packing slips, that may be packed with food products, fireworks, furniture, chemicals or any other product or material liable to damage from exposure to atmospheres of high humidity. By inserting such a slip with each package of material, the consumer upon opening the package will have definite proof that during transit and storage the material or product has not been exposed to conditions of moisture sufficient to cause deterioration or damage to the goods.

I am aware that toys have been previously made under the general name of "Magic Painting Books," in which pictures or designs are printed with an ink consisting of a water-soluble dye and a suitable water-soluble binding agent. These printed sheets change color upon being wet with water, due to the solution of the dye in the water, and the spreading of this dye over the surface of the paper by the action of the paint brush. None of these toys of the prior art function in the absence of liquid water, however, and they are intended and designed to be permanent in air, even of relatively high humidity, and only function, and are only intended to function, by the action of liquid water. My invention is distinguished from these devices through the fact that my dampness-detecting devices function through the effect of conditions of high humidity, in the absence of liquid water, and through the mere action of moisture-laden air with certain definite and desired ranges of humidity.

I am also aware that barometers have long been made by saturating cloth or paper with certain salts of the element cobalt, and that such devices change color when exposed to the atmosphere within certain ranges of humidity. These devices produce a reversible change, however, and would be valueless in connection with the applications for which my present invention is adapted. For example, if such cobalt-treated paper were put in a box of goods, and the box of goods became wet, subsequent drying would completely remove the change or effect produced by the action of the damaging conditions of high moisture content, and the test paper would indicate the condition of dryness that actually existed in the package after the drying operation, and would therefore afford no indication of the previous existence of excessive and damaging humidity.

Many modifications may be made in the application of my invention, in the preparation of papers or test surfaces for specific purposes. I have found, for example, that the addition of certain agents to my mixture of dye and deliquescent agent tend to have an activating effect upon the mixture, and to increase its sensitiveness. For reasons not fully known to me, the addition of small amounts of tartaric acid, citric acid or phenol, have an activating effect upon the penetration of the dye solution through the porous paper, probably through modifying the surface tension of the liquid produced when the dye dissolves in the solution of the deliquescent agent and the water which it absorbs. It will of course be evident that when acids are used as agents to modify the penetration of the dye solution, it is not admissible to employ alkali carbonates or bicarbonates as deliquescent agents. I prefer to employ alkali nitrates or chlorides as my deliquescent agents, in all mixtures where free acids are employed in the compositions. It will also be evident that the use of organic acids is incompatible with certain dyes, and I always employ dyes that are not sensitive to acids, in all forms of my invention in which acids are used as a portion of the dampness detecting mixture. In one special form of my invention I employ a deliquescent agent in association with a water-soluble organic acid, on a paper colored with a dye that is sensitive to acid. In this special embodiment of my invention, the deliquescent agent absorbs water, the solution so formed dissolves the organic acid and the solution of the organic acid then "strikes through" the porous paper and modifies the color of the acid-sensitive dye that is present on the paper. I may also employ a chemical reaction which itself produces a color or a color change when moisture and acid are present.

I have also found, that by wetting and subsequently drying the porous sheet upon which I later apply my mixture of dye and deliquescent agent, with any one of a number of the newer "wetting agents" which are now available on the market under such trade names as Aerosol, Tergitol, Areskap, Igepon, Dreft, Daxad, Santomerse, Duponol, Darvan and the like, the sensitiveness of my indicating papers is increased, probably because these agents facilitate the entry of moisture through the facing paper, or into and through the admixture of dye and deliquescent agent. These agents may be either used as a part of the dye admixture, or may be applied to the porous support before the dye admixture has been applied to the supporting surface.

I find that the sensitiveness of my dampness-detecting and indicating products is also influenced, to a considerable extent, by the thinness and the porosity of the paper to which I apply my humidity-indicating chemical mixture. Very thin paper, of the thinness of toilet tissue, is notably more sensitive than thicker paper, but very thin paper has the disadvantage of permitting any markings or designs printed upon the back of the sheet to be visible through the sheet by transmitted light. I have found that by using very thin porous paper, opacified by the addition of titanium or zirconium pigments, or any other pigments of very high "hiding power", I can completely overcome this difficulty. I have also found a way in which I can eliminate this difficulty, without the employment of paper of high opacity. For example, by printing the letters "damp" on the back of a very thin sheet of tissue, using my new dampness-detecting ink and applying this ink to form the letters either in a solid coat or in a stipple, the letters so produced will readily show through the thin tissue if it is made of paper of ordinary translucency. However, by then printing all the rest of the back of the sheet with ordinary printing ink, applied either solid or in stipple, as was done in the first printing, I obtain an equal degree of grayness over all parts of the sheet, when viewed from the front, and the special lettering or marking is invisible. When such paper is exposed to high humidity, however, this equal grayness at once disappears, and the letters forming the words "damp" appear upon the surface of the paper in brilliant color. This is due to the fact that the high humidity has no effect upon the ordinary printing ink forming the body of the design, although this humidity causes the liquefaction of the deliquescent agent used in forming the special wording or marking, and as a result of the solution of the dye in the liquid produced by the deliquescence of the special mixture, the desired portion of the design "strikes through" the thin paper, and gives the desired indication against the background of uniform gray formed by the remainder of the printed design.

In order to make clear that the bodying agent which I prefer to employ in the practice of my present invention is not an essential feature of my invention, although it forms a highly desirable portion of my invention in practice, I will now describe one form of my invention in which no bodying liquid is employed. In this special form of my invention I may coat a sheet of any ordinary kind of paper with a thin layer of rubber cement. While this rubber cement is still adhesive, I sprinkle over the surface of the paper a pulverulent admixture of my dye and my deliquescent agent. I then cover this assembly with a thin sheet of porous paper, pressing the two sheets of paper together so that the intermediate layer of rubber cement forms a bond or cement, to give a triplex layer made up of two outer sheets of paper and an inner layer of rubber cement holding as in a matrix particles of the admixture of deliquescent agent and dye. This paper may be cut up into strips, etc. and although it contains no acacia or other water-soluble bodying agent, it behaves in all respects the same as sheets prepared in accordance with the preferred examples of the application of my invention.

The essential elements of my invention are an admixture of a water-soluble dye of high color strength and a hygroscopic substance which is deliquescent under conditions of high humidity, preferably in association with a porous supporting surface. Although I prefer to employ paper as my porous supporting surface, it will of course be evident that my invention is not limited to a paper supporting surface, and that any other cellulosic or non-cellulosic porous supporting material, capable of permitting the spread of the solution produced by the dissolving of the dye is not necessary, as a particle of deliquescent of the deliquescent agent, may be used with equally satisfactory results. I have successfully used paper, cloth and a number of other porous supporting materials in the application of my invention, with results similar in general to those obtained in the preferred embodiment of my invention.

The use of wetting agents, penetrating agents, spreading agents, etc. in conjunction with my present invention, as a means of facilitating the absorption of water by my deliquescent agent, form variants of my invention, but my invention may be employed with or without the use of wetting agents, penetrants, introfying agents or other materials which modify surface tension, or which modify the tendency of water vapor to either be taken up by the deliquescent agents used in connection with my invention, or the spread or migration of the dye solution later formed as the result of the dissolving of the dye in the liquid produced by the deliquescence of my highly hygroscopic deliquescent agent.

By "intimate mechanical admixture" and "intimate mechanical association," as used in the specification and in the claims, is meant physical association of such closeness or intimacy that physical action and reaction between the components is possible under the conditions which exist in the normal use of the device. Actual touching of particles of deliquescent agent and dye is not necessary, as a particle of reliquescent salt in the action of deliquescing absorbs water and produces a volume of liquid equal to several times the original volume of the initial dry particle of deliquescent salt, and accordingly a particle of dry deliquescent agent will in deliquescing dissolve a particle of dye that is separated from it by even two or three times the average diameter of the initial particle. Accordingly, the meaning of the word "intimate" as used in this specification, is not to be understood as necessarily representing absolute physical contact, but is to be considered as comprising all degrees of close association between the limits of actual physical contact and association within the distance at which the particles can, under the conditions of their actual use, physically react with one another. Although for many purposes actual physical contact of the particle of solid deliquescent agent and the particle of dye material is desirable, such actual physical contact is not necessary, and intimate mechanical association within the limits of the radius of action or the sphere of action of the deliquescent particles, which is normally between two and three times the actual diameter of the particles, gives equally satisfactory results.

I do not claim as any part of my present invention irreversible moisture detecting or indicating devices in which color changes, including the production of color or the destruction of color, are brought about as the result of chemical reactions initiated by the presence of water absorbed by a hygroscopic deliquescent agent, as such devices form the subject matter of my co-pending application S. N. 185,153, filed January 15, 1938. My present invention is limited to irreversible moisture detecting and indicating devices in which color effects or color changes are produced as the result of physical changes unassociated with chemical changes, the color effects being produced by such purely physical effects as the migration through capillarity of a liquid solution of a dye through a porous medium, for example, whereas my co-pending application S. N. 185,153, filed January 15, 1938 is strictly concerned with color changes produced as the result of chemical changes, and in many cases in the absence of such physical changes as the movement or migration of a coloring material through a porous support.

It will be evident that many modifications may be made within the scope of the disclosure as herein outlined without departing from the essential features of my invention as herein described, and accordingly no limitations should be placed upon my invention, except as indicated in the appended claims.

I claim:

1. A warning indicator for use with goods liable to damage or deterioration when subjected to dampness above a certain degree, comprising a sheet of absorbent material, a deliquescent agent associated with said sheet of the type to remain dry up to about the particular percentage of relative humidity which will damage the goods and to absorb moisture from air above such humidity and thereby to wet the sheet when subjected to moisture above such percentage, and a dye soluble in the water of deliquescence to yield a substantially irreversible color contrasting with the sheet when absorbed thereby, said dye being so positioned with respect to the sheet and the agent as to be brought into solution by the liquefying of the agent and to be absorbed by the sheet to retain said contrasting color when dried after such wetting, whereby when the indicator has been subjected to excessive dampness the agent will wet the material and dissolve the dye, the dye solution will penetrate the sheet of absorbent material leaving a substantially irreversible color on the sheet to warn of the deterioration of the goods.

2. An indicator comprising a sheet of absorbent material, a deliquescent agent associated therewith, water-soluble, high coloring strength dye particles sufficiently adjacent said agent and one side of the material as to be in substantial contact therewith, said dye being of the type to dissolve in the water of deliquescence and to be absorbed by the material to penetrate the same and to leave on the opposite side of the sheet areas of irreversible bright color.

3. An indicator comprising a base support and an absorbent, relatively opaque front, having between them in intimate mechanical association a deliquescent agent and a dye, said agent being of the type to remain dry up to a certain percentage of relative humidity and to absorb water from the air above such humidity, said dye being soluble in the deliquescent solution to penetrate the absorbent front when in solution to leave an irreversible colored indication on the outer surface of the front to show that the indicator has been subjected to dampness above that at which the deliquescent agent remains dry.

4. In combination, an agent comprising a mixture of a plurality of deliquescent salts, a porous material associated therewith to be wetted thereby, and dye means invisible through the material when dry but of the type to penetrate the porous material when in solution to irreversible color the material when the agent has been subjected to the relative humidity at which it will liquefy.

5. In combination, a backing sheet, a facing sheet of porous material secured thereto by a binder, a hygroscopic salt and a watersoluble dye in dry particle form in intimate mechanical association with said binder, said dye being of the type which goes into solution with the water of deliquescence to form a substantially irreversible color penetrating the front side of the facing sheet by capillary action to produce a contrasting mark which does not change color when dried after wetting, thereby leaving a permanent record of exposure to dampness above that at which the hygroscopic salt absorbs moisture.

MARJORIE G. SNELLING.